US012719954B2

(12) United States Patent
Muñoz De La Torre et al.

(10) Patent No.: US 12,719,954 B2
(45) Date of Patent: Aug. 25, 2026

(54) MANAGING CONTENT PROVIDER MULTI-PATH POLICIES

(71) Applicant: Telefonaktiebolaget LM Ericsson (publ), Stockholm (SE)

(72) Inventors: Miguel Angel Muñoz De La Torre, Madrid (ES); Veronica Sanchez Vega, Madrid (ES); Marcus Ihlar, Älvsjö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 390 days.

(21) Appl. No.: 18/276,316

(22) PCT Filed: Jan. 31, 2022

(86) PCT No.: PCT/EP2022/052241

§ 371 (c)(1),
(2) Date: Aug. 8, 2023

(87) PCT Pub. No.: WO2022/167374

PCT Pub. Date: Aug. 11, 2022

(65) Prior Publication Data

US 2024/0121309 A1 Apr. 11, 2024

(30) Foreign Application Priority Data

Feb. 8, 2021 (EP) .................................... 21382098

(51) Int. Cl.

| | |
|---|---|
| ***H04L 67/14*** | (2022.01) |
| ***H04L 69/14*** | (2022.01) |
| ***H04W 76/12*** | (2018.01) |

(52) U.S. Cl.

CPC ............. *H04L 67/14* (2013.01); *H04L 69/14* (2013.01); *H04W 76/12* (2018.02)

(58) Field of Classification Search

CPC ............................... H04L 45/24; H04M 15/66

(Continued)

(56) References Cited

U.S. PATENT DOCUMENTS

2013/0077501 A1 3/2013 Krishnaswamy et al.
2020/0178196 A1 * 6/2020 Wang ................. H04W 60/005

(Continued)

OTHER PUBLICATIONS

EPO Communication dated Oct. 24, 2024 for European Patent Application 22706016.7, consisting of 13-pages.

(Continued)

*Primary Examiner* — Fabricio R Murillo Garcia
(74) *Attorney, Agent, or Firm* — Weisberg I.P. Law, P.A.

(57) ABSTRACT

A method for implementing an AF multipath policy. The method may be performed by a PCF and may include a step of transmitting a request message comprising a UE ID identifying a UE. The method also includes receiving a response message transmitted as a response to the request message, the response message comprising: the AF multipath policy, an application ID (App-ID) identifying an application, and an application protocol ID (App-ID-Protocol), identifying a protocol used by the application. The method further includes generating a multipath policy using at least: i) the AF multipath policy and ii) the App-ID-Protocol. The method further includes providing the generated multipath policy to a management function (e.g., SMF).

6 Claims, 14 Drawing Sheets

(58) Field of Classification Search
USPC ........................................................ 455/414.1
See application file for complete search history.

(56) References Cited

U.S. PATENT DOCUMENTS

2020/0287975 A1* 9/2020 Li ......................... H04L 67/146
2021/0037380 A1* 2/2021 Lee ......................... H04W 8/06
2021/0168905 A1* 6/2021 Yu ......................... H04W 76/15
2022/0248479 A1* 8/2022 Yu ......................... H04W 76/20
2023/0133781 A1* 5/2023 Yao ....................... H04M 15/66
455/406

OTHER PUBLICATIONS

Hasegawa, Y et al.; Improved Data Distribution for Multipath TCP Communication; Global Telecommunications Conference; IEEE Globecom 2005, vol. 1; Nov. 28, 2005, consisting of 5 pages.

International Search Report and Written Opinion with Transmittal dated Jul. 11, 2022 issued in International Patent Application No. PCT/EP2022/052241 (23 pages).

3GPP TR 23.793 V16.0.0, Dec. 2018, Technical Report, 3rd Generation Partnership Project; Technical Specification Group Services and System Aspects; Study on access traffic steering, switch and splitting support in the 5G system architecture (Release 16), XP051591224 (114 pages).

3GPP TR 23.700-93 V1.2.0, Nov. 2020, Technical Report, 3rd Generation Partnership Project; Technical Specification Group Services and System Aspects; Study on Access Traffic Steering, Switch and Splitting support in the 5G system architecture Phase 2, (Release 17), XP051961726 (101 pages).

3GPP TS 29.522 V16.5.0, Sep. 2020, Technical Specification, 3rd Generation Partnership Project; Technical Specification Group Core Network and Terminals; 5G System; Network Exposure Function Northbound APIs; Stage 3 (Release 16) (161 pages).

ETSI TS 123 501 V16.6.0, Oct. 2020, Technical Specification, 5G; System architecture for the 5G System (5GS) (3GPP TS 23.501 version 16.6.0 Release 16) (450 pages).

EPO Communication dated May 27, 2025 for Patent Application No. 22706016.7, consisting of 6 pages.

* cited by examiner

900

MANAGING CONTENT PROVIDER MULTI-PATH POLICIES

CROSS REFERENCE TO RELATED APPLICATIONS

This application is a 35 U.S.C. § 371 National Stage of International Patent Application No. PCT/EP2022/052241, filed Jan. 31, 2022, which claims priority to EP Application Serial No. 21382098.8, filed on Feb. 8, 2021, which is incorporated by this reference.

TECHNICAL FIELD

This disclosure relates to methods, devices, computer programs and carriers related to managing content provider multipath policies.

BACKGROUND

Multi-Access and Multipath

User equipments (UEs), such as, for example, mobile communication devices, support multiple connectivity to different access network types, such as 3GPP access types (e.g., Long Term Evolution (LTE), 5G New Radio (NR) and non-3GPP access types (e.g., Wi-Fi™).

Each access type provides distinct Quality of Service (QoS) and capacity characteristics to the data transmission which vary for a given network location and over time and can imply a distinct charging tariffs for the subscriber (e.g. free WIFI and limited volume quota for 3GPP). Additionally, each access type has a distinct cost in terms of mobile device battery use.

With the growth of Internet traffic and new services demanding improved Quality of Experience (QoE), both content providers and mobile network operators are deploying their own solutions to control the steering and switching of an application's data flow or the split of a data flow across 3GPP and non-3GPP access. Content providers are interested on maximizing QoE and reliability for the users of its applications without increasing subscriber cost. Network operators are interested in optimizing their network resources and lowering their costs as well as on improving overall subscriber QoE.

Multipath transmission solutions are well defined in the industry and by Internet Engineering Task Force (IETF) standards, ranging from link to application level techniques. Transport multipath protocols such as MP-TCP (Multipath TCP), QUIC, or future MP-QUIC (Multipath QUIC) are becoming an interesting choice for content providers. Their end-to-end flow control and congestion control allow to switch and split data flows in a QoE friendly manner and seamless to the application and underlying network. Such multipath transmission from client to end server is called native multipath. With MP-TCP, content providers depend on the device vendor operating system to support an MP-TCP client proxy and expose an application programming interface (API) to the application for selecting the preferred multipath policy, mobile steering decision will be based on such policy and device battery criteria. In case of QUIC, applications can implement QUIC transport layer and thus enforce their own multipath policy without any terminal dependency. QUIC is a name not an acronym but is sometimes referred to as "Quick UDP Internet Connections." The latest specification for QUIC can be found at the URL: tools.ietforg/html/draft-ietf-quic-transport-34.

Network operators, however, rely on 3rd Generation Partnership Project (3GPP) multi-access solutions, which in Evolved Packet Core (EPC) and 5G Core (5GC) release 15 (Rel-15) system focusses on providing seamless Internet Protocol (IP) session mobility across 3GPP and Wi-Fi accesses to the applications, typically IP Multimedia Subsystem (IMS) voice mobility between 3GPP and Wi-Fi by means of wireless local area network (WLAN) interworking solution with Packet Core. Some network operators also want to control the Wi-Fi offload of data services. Because the steering decision is local to the UE, 3GPP has defined various solutions to distribute network operator policies to the UE, such as Access Network Discovery and Selection Function (ANDSF) or Network based IP session mobility (NBIFOM).

Some network operators are deploying standalone MP-TCP proxies in their network in agreement with device vendors. Such proxies are usually bypassed in case multipath is applied natively by the content providers.

3GPP release 16 (Rel-16) has defined a new, optional solution for 5GC called Access Traffic Steering Switching Splitting (ATSSS), which allows simultaneous connectivity of a protocol data unit (PDU) session across 3GPP and non-3GPP access by means of a Multi-Access (MA) PDU (MA-PDU) session. An uplink (UL) traffic steering policy (e.g. non-3GPP first, load balance, etc.) for a service data flow is signaled to the UE and a downlink (DL) traffic steering policy for the service data flow is signaled to the anchor User Plane Function (UPF) at the time of session setup. ATSSS introduces the MP-TCP proxy as an anchor UPF function and proposes other methods for steering QUIC traffic such as IP flow switching or QUIC tunneling across device and UPF path.

UE Assisted Traffic Steering

An enhancement to the current Rel-16 ATSSS standard has been proposed that gives the UE more freedom on how to steer, switch, and split traffic in uplink. In this case, the Policy Control Function (PCF) can authorize a "UE assistance steering mode operation," that allows the UE to decide how traffic is steered, switched, and split between 3GPP and non-3GPP access based on UE state (e.g. battery consumption) and UE knowledge of access conditions (e.g., UE conditions that cannot be known in the network). This "UE assistance steering mode operation" is proposed by UE vendors (e.g. Google, Apple, Qualcomm etc) for release 17 (Rel-17) and documented in 3GPP Technical Report (TR) 23.700-93 (clause 6.12), but not yet agreed to be included in rel-17.

IETF MASQUE

IETF has created a new working group, aimed to develop mechanism(s) that allow configuring and concurrently running multiple proxied stream-based and datagram-based flows inside an HTTPS connection. These mechanism(s) are collectively called Multiplexed Application Substrate over QUIC Encryption (MASQUE). The working group will specify HTTP and/or HTTP/3 extensions to enable this functionality.

By using MASQUE, the client and/or server (usually the client) explicitly contacts a proxy (e.g. a QUIC Proxy) in order to expose information between the content provider (Client and/or Server) and the mobile network operator (e.g. QUIC Proxy at UPF). An inner connection carries (encrypted) application traffic between client and server (not visible to the proxy), while an outer connection can be used to expose information between the content provider (Client and/or Server) and the mobile network operator (e.g. QUIC Proxy at UPF).

SUMMARY

An object of this disclosure is to enable provisioning and implementation of a content provider multipath policy.

Certain challenges presently exist. For instance, the current ATSSS proposal does not allow content providers to influence an ATSSS traffic steering policy. Today it is not possible to trigger traffic steering rules based on application indication (e.g. aggregate only during video initial buffering) and to consider which traffic steering modes (e.g. 1:1, lowest delay, aggregate) are preferred from the content provider perspective. This will improve the ATSSS solution flexibility to truly boost QoE with the minimal network resource cost. In fact, current MP-TCP iOS deployments allow, for example, some UE vendors to offer an API to their device apps to select within existing steering policies only at the moment of the connection setup, but in this case, policy coordination with the network operator has not been discussed nor defined in the 3GPP ATSSS solution.

Another problem with the existing ATSSS proposals is that it is difficult for a PCF to select in Policy and Charging Control (PCC) rules what steering functionality (MP-TCP, QUIC) applies to a certain data flow, since the functionality depends on the layer 4 (L4) (e.g., transport layer) protocol stack used by the content provider. The transport stack of a content provider can change over time and even server by server, and the PCF is agnostic to this (not reported by existing T8/N4 procedures). This is particularly a problem for content providers migrating from the Transmission Control Protocol (TCP) to the QUIC transport layer protocol.

This disclosure aims to enable implementation of a content provider (a.k.a., application function (AF)) multipath policy. Accordingly, in one aspect there is provided a method for implementing an AF multipath policy. The method may be performed by a PCF and may include a step of transmitting a request message comprising a UE ID identifying a UE. The method also includes receiving a response message transmitted as a response to the request message, the response message comprising: the AF multipath policy, an application ID (App-ID) identifying an application, and an application protocol ID (App-ID-Protocol), identifying a protocol used by the application. The method further includes generating a multipath policy using at least: i) the AF multipath policy and ii) the App-ID-Protocol. The method further includes providing the generated multipath policy to a management function (e.g., a Session Management Function (SMF)). In another aspect there is provided a computer program comprising instructions which when executed by processing circuitry of a network node causes the network node to perform the method. In another aspect there is provided a carrier containing the computer program, wherein the carrier is one of an electronic signal, an optical signal, a radio signal, and a computer readable storage medium. In another aspect there is provided a network node, where the network node is configured to perform the method. In some embodiments, the network node includes processing circuitry; and a memory containing instructions executable by the processing circuitry, whereby the network node is configured to perform methods disclosed herein.

In another aspect, there is provided a method performed by a UE for implementing an AF multipath policy. The method includes initiating the establishment of a multi-access (MA) protocol data unit (PDU) session. The method also includes, after initiating the establishment of the MA PDU session, receiving a rule comprising a first UL multipath policy. In some embodiments, the rule further includes an indicator indicating whether or not a content provider assisted mode is allowed. The method also includes, after receiving the rule, applying the first UL multipath policy to UL PDUs containing application data provided by an application running on the UE. The method also includes receiving a request from the application to apply a second UL multipath policy to subsequent UL PDUs containing application data provided by the application, wherein the second UL multipath policy is different than the first UL multipath policy. In another aspect there is provided a computer program comprising instructions which when executed by processing circuitry of a UE causes the UE to perform the method. In another aspect there is provided a carrier containing the computer program, wherein the carrier is one of an electronic signal, an optical signal, a radio signal, and a computer readable storage medium. In another aspect there is provided a UE, where the UE is configured to perform the method. In some embodiments, the UE includes processing circuitry; and a memory containing instructions executable by the processing circuitry, whereby the network node is configured to perform methods disclosed herein.

In another aspect there is provided a method for use in onboarding an application function (AF) multipath policy (AFMultipathPolicy). The method includes an AF transmitting an onboarding request. The onboarding request includes: an AF identifier, ID, that identifies the AF, a service identifier indicating that the AF supports an event exposure service, an event identifier indicating that the AF supports multipath policy event as part of the event exposure service, and application ID information comprising at least one application ID, App-ID, that identifies a specific application. In another aspect there is provided a computer program comprising instructions which when executed by processing circuitry of an AF causes the AF to perform the method. In another aspect there is provided a carrier containing the computer program, wherein the carrier is one of an electronic signal, an optical signal, a radio signal, and a computer readable storage medium. In another aspect there is provided a network node implementing the AF, where the network node is configured to perform the method. In some embodiments, the network node includes processing circuitry; and a memory containing instructions executable by the processing circuitry, whereby the network node is configured to perform methods disclosed herein.

In another aspect there is provided a method for provisioning an application function (AF) multipath policy (AFMultipathPolicy). The method includes an AF uploading the AFMultipathPolicy by transmitting to a network node (e.g., a network node implement an NEF), The message includes: an AF identifier, ID, that identifies the AF, a service identifier indicating that the AF supports an event exposure service, an event identifier indicating that the AF supports multipath policy event as part of the event exposure service, application ID information comprising at least one application ID, App-ID, that identifies a specific application, and the AFMultiPathPolicy. In another aspect there is provided a computer program comprising instructions which when executed by processing circuitry of an AF causes the AF to perform the method. In another aspect there is provided a carrier containing the computer program, wherein the carrier is one of an electronic signal, an optical signal, a radio signal, and a computer readable storage medium. In another aspect there is provided a network node implementing the AF, where the network node is configured to perform the method. In some embodiments, the network node includes processing circuitry; and a memory containing instructions executable by the processing circuitry, whereby the network node is configured to perform methods disclosed herein.

In another aspect there is provided a method performed by user plane network node (e.g., a network node implanting a 5G UPF). The method includes receiving session management parameters transmitted by a session management node, the session management parameters being related to a session being established for a UE. The session management parameters include: a packet detection rule (PDR), a multi-access rule (MAR) comprising a first downlink (DL) multipath policy, and a content provider assisted flag indicating whether or not content provider assistance is allowed. In another aspect there is provided a computer program comprising instructions which when executed by processing circuitry of a user plane network node causes the user plane network node to perform the method. In another aspect there is provided a carrier containing the computer program, wherein the carrier is one of an electronic signal, an optical signal, a radio signal, and a computer readable storage medium. In another aspect there is provided a user plane network node, where the network node is configured to perform the method. In some embodiments, the network node includes processing circuitry; and a memory containing instructions executable by the processing circuitry, whereby the network node is configured to perform methods disclosed herein.

An advantage of the embodiments disclosed herein is that they enable content providers to influence ATSSS traffic steering policies. For example, with the advent of encryption there are certain application events, such as video rebuffering, that are not visible to the network but that should trigger the use of a different steering policy. The embodiment herein enable an application running on a UE initiate a different steering policy in response to the application detecting the application event (e.g., an empty buffer). It is smarter to do traffic aggregation policy when the application needs a bandwidth boost rather than just all the time (which drains battery and network resources). The embodiments also allows triggering traffic steering rules based on application indication (e.g. aggregate only during video initial buffering) and to consider which traffic steering modes (e.g. 1:1, lowest delay, aggregate) are preferred from the content provider perspective. The embodiments also allow the mobile network operator (MNO) to address the challenge to select the steering functionality (MP-TCP or MPQUIC/low layer (LL) ATSSS) since MNO is not aware of the application protocol stack. For example, Facebook is now migrating their servers from using TCP to using a QUIC protocol stack in some countries, and there is no 3GPP solution which notifies PCF on the actual transport stack used by a given flow. In this Facebook example, the network will think ATSSS is applied to Facebook (through MP-TCP proxy) when it is actually not. Embodiments disclosed herein solve this problem.

BRIEF DESCRIPTION OF THE DRAWINGS

The accompanying drawings, which are incorporated herein and form part of the specification, illustrate various embodiments.

DETAILED DESCRIPTION

Figure 1:
FIG. 1 illustrates a communication system according to an embodiment.
Figure 1:
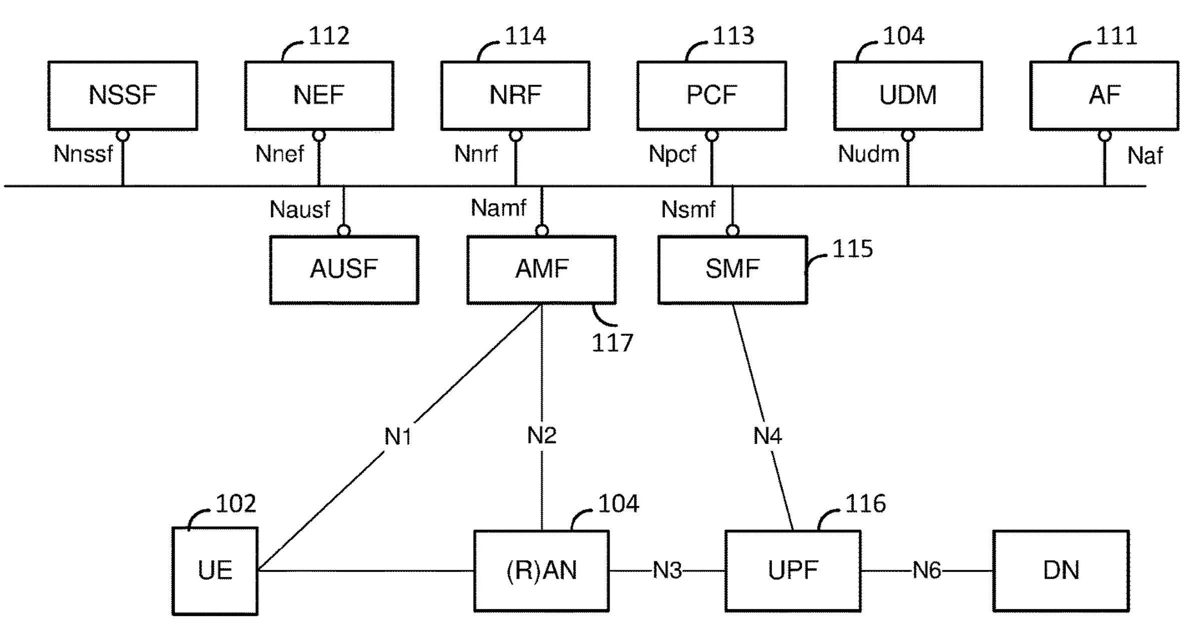

FIG. 1 illustrates a communication system 100 according to an embodiment. In the embodiment shown, communication system 100 is a 5G communication system. Communication system communicates with a user equipment (UE) 102 and includes an access network (AN) 104 (e.g., a radio access network (RAN)) and a set of network function. As used herein, a UE is any device capable of communicating with a network function via access network 104. Examples of UE 102 include: a smartphone, a home computer, a head-mounted display (HMD), a gaming console, a streaming device, a tablet, an appliance, a sensor, a vehicle, a gateway, a router, etc. A network function can be implemented either as a network element on a dedicated hardware, as a software instance running on a dedicated hardware, or as a virtualized function instantiated on an appropriate platform, e.g. on a cloud infrastructure.

In the example shown, the network functions include the following function: Application Function (AF) 111, Network Exposure Function (NEF) 112, Policy Control Function (PCF) 113, Network Resource Function (NRF) 114, Session Management Function (SMF) 115, and a User Plane Function (UPF) 116.

AF 111 interacts with the 3GPP Core Network through NEF 112. NEF 112 supports different functionality and acts as an entry point for AF 111 into the operator's network. PCF 113 supports a unified policy framework to govern the network behavior. NRF 114 supports registration and discovery procedures.

SMF 115 supports, among other things, session establishment, session modification, second release, as well as policy related functionalities like termination of interfaces toward PCF 113, charging data collection, support of charging interfaces and control and coordination of charging data collection at UPF 116. SMF 115 receives rules (e.g., PCC) from PCF 113 and configures UPF 116 accordingly through a N4 reference point (Packet Flow Control Protocol (PFCP)).

For example, SMF 115 controls the packet processing in UPF 116 by establishing, modifying or deleting PFCP Sessions and by provisioning (e.g., adding, modifying or deleting) packet detection rules (PDRs), forwarding action rules (FARs), QoS enforcement rules (QERs) and/or usage reporting rules (URRs) per PFCP session, whereby a PFCP session may correspond to an individual PDU session or a standalone PFCP session not tied to any PDU session.

Each PDR shall contain Packet Detection Information (PDI) (i.e., one or more match fields against which incoming packets are matched) and may be associated to the following rules providing the set of instructions to apply to packets matching the PDI: one or more FARs, zero or more QERs, which contain instructions related to the QoS enforcement of the traffic; zero or more URRs, which contain instructions related to traffic measurement and reporting; and zero or one MAR, which contains instructions related to Access Traffic Steering, Switching and Splitting (ATSSS) for the downlink traffic of a Multi-Access (MA) PDU session. A downlink PDR can be associated with two FARs for a N4 session established for a MA PDU session as a MAR contains two FARs for 3GPP and non-3GPP respectively.

Each FAR contains instructions related to the processing of the packets as follows: 1) an Apply Action parameter, which indicates whether the user plane (UP) function shall forward, duplicate, drop or buffer the packet with or without notifying the control plane (CP) function about the arrival of a DL packet, or whether the UP function shall accept or deny UE requests to join an IP multicast group and 2) forwarding, buffering and/or duplicating parameters, which the UP function shall use if the Apply Action parameter requests the packets to be forwarded, buffered or duplicated respectively. These parameters may remain configured in the FAR regardless of the Apply Action parameter value, to minimize the changes to the FAR during the transitions of the UE between the idle and connected modes. The buffering parameters, when present, shall be provisioned in a Buffering Action Rule (BAR) created at the PFCP session level and referenced by the FAR.

UPF 116 supports handling of user plane traffic based on the rules received from SMF 115. For example, packet inspection (through PDRs) and different enforcement actions, e.g. traffic steering, QoS, Charging/Reporting (through FARs, MARs, QERs, URRs).

As noted above in the Summary, certain challenges presently exist. For instance, the current ATSSS proposal does not allow content providers to influence an ATSSS traffic steering policy such that, for example, it is not possible to trigger traffic steering rules based on application indication (e.g. aggregate only during video initial buffering) and to consider which traffic steering modes (e.g. 1:1, lowest delay, aggregate) are preferred from the content provider perspective. Additionally, is that it is difficult for a PCF to select in PCC rules what steering functionality (MP-TCP, QUIC) applies to a certain data flow, since the functionality depends on the layer 4 (L4) (e.g., transport layer) protocol stack used by the content provider.

To overcome these problems, this disclosure provides a mechanism by which a content provider may dynamically expose its preferred multipath policies (e.g., preferred steering mode for a certain application/traffic flow and for a certain subscriber) to the mobile network operator. This disclosure also provides an extension to the UE assisted mode of operation in which a flag to indicate content provider assisted mode is allowed and a list of UL and/or DL steering modes. N4 rules (PDR/MAR) are also proposed to be extended with a flag to indicate content provider assisted mode is allowed. The UE can expose this list to the application (a.k.a., "client") running on the UE by means of an internal API (e.g. it could be an extension of the existing MP-TCP API in iOS or a new API). This disclosure further provides extending the UE assisted procedures between UE and UPF so the UE can signal to UPF a preferred DL policy for a data flow. In one embodiment, MASQUE or Performance Measurement Function (PMF) can be used by the UE to signal to the UPF the preferred DL policy.

In one embodiment, this disclosure provides an extension of the exposure policy framework, specifically for the content provider (e.g., the content provider's AF) to dynamically expose a preferred multipath policy (e.g., for a certain application and for a certain subscriber) to the network operator (e.g., NEF). For example, in one embodiment, there is provided an "AF onboarding procedure" where the content provider indicates the support of a new event (e.g., Event-ID=MultipathPolicy) as part of the Naf_EventExposure service. There is also disclosed a "pull procedure" where the MNO requests (pulls) from the content provider information specifying the content providers preferred multipath policies and a "push procedure" where the content provider pushes to the MNO the multipath policies. Further, there is described an extension of the UE assisted mode. Moreover, an embodiment is disclosed specifically for the scenario where Nnef APIs are not supported (e.g. in case of small Content Providers and/or small MNOs).

The AF onboarding procedure.

Figure 2:
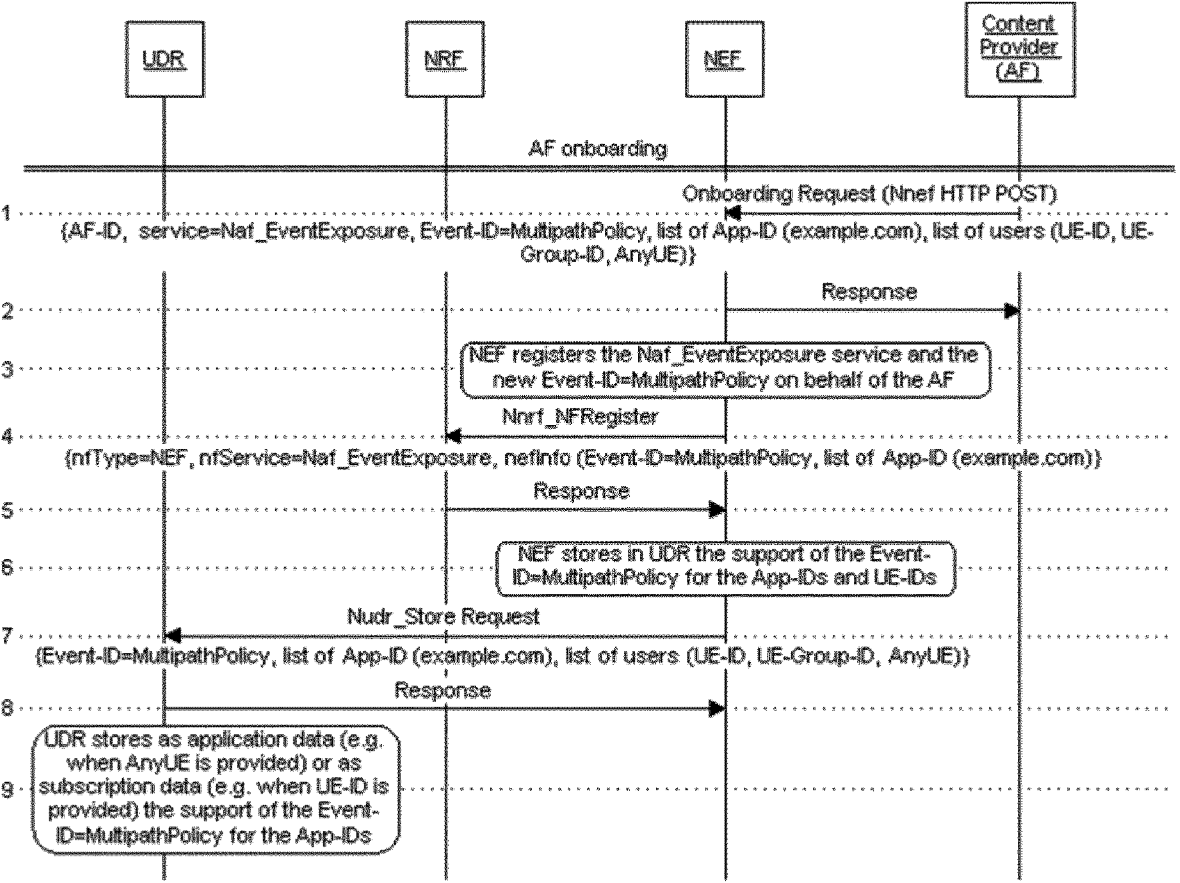
FIG. 2 illustrates an onboarding procedure.

FIG. 2 illustrates the AF onboarding procedure according to an embodiment.

In step 1, AF 111 triggers onboarding procedure into network operator's NEF indicating the support of a new event (Event-ID=MultipathPolicy) as part of the Naf_EventExposure service, including the following parameters: i) AF-ID (indicates the AF identifier); ii) Service=Naf_EventExposure (indicates the AF supports an Event Exposure service); iii) Event-ID=MultipathPolicy (indicates the AF supports a new Event (MultipathPolicy) as part of the Event Exposure service above); iv) a list of App-IDs (specifies the App-IDs to which the AF can provide the new event (e.g. example.com application); v) a list of users (specifies the users to which the AF can provide the event (UE-ID or list of UE-IDs, UE-Group-ID or list of UE-Group-ID, or AnyUE) (in one embodiment, this parameter is optional and by default is set to AnyUE).

In step 2 the NEF answers the AF with a successful response (accepting the onboarding request).

In steps 3 and 4, after onboarding procedure, AF (or NEF on behalf of the AF) registers the above event in the NRF, allowing discovery by any potential consumer (e.g. PCF, Network Data Analytics Function (NWDAF)). In this example, NEF registers the Naf_EventExposure service and the new Event-ID=MultipathPolicy on behalf of the AF. In order to do this, NEF triggers towards NRF a Nnrf_NFRegister message, including the following parameters: i) nfType=NEF; ii) nfService=Naf_EventExposure; and iii) nefInfo, including Event-ID=MultipathPolicy, list of App-ID (example.com).

In step 5, the NRF answers NEF with a successful response (accepting the registration).

In steps 6 and 7, the NEF stores in a data repository (e.g., a Unified Data Repository (UDR)) the support of the Event-ID=MultipathPolicy for the App-IDs and UE-IDs. In order to do this, NEF triggers a Nudr_Store Request message, including the following parameters: Event-ID=MultipathPolicy; list of App-ID (example.com); list of users (UE-ID, UE-Group-ID, AnyUE).

In step 8, the UDR answers the NEF with a successful response (accepting the store request).

In step 9, the UDR stores as application data (e.g. when AnyUE is provided) or as subscription data (e.g. when UE-ID is provided) the support of the Event-ID=MultipathPolicy for the App-IDs.

The above onboarding procedure allows request/response and subscribe/notify operations from a consumer (e.g. PCF through NEF) relative to the new event (Event-ID=MultipathPolicy) as part of the Naf_EventExposure service.

Pull Procedure.

Figure 3:
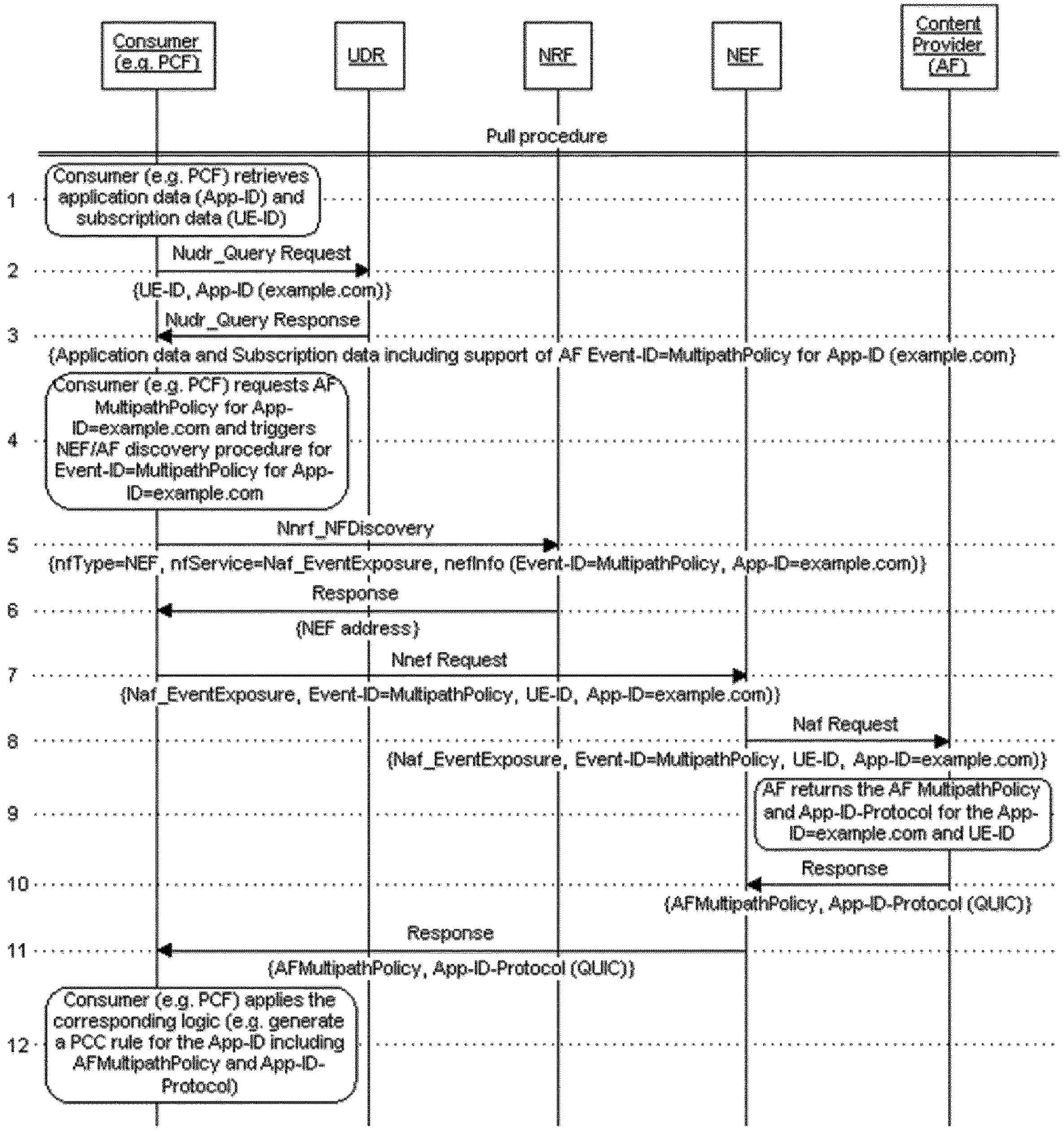
FIG. 3 illustrates a pull procedure.

FIG. 3 illustrates a pull procedure according to an embodiment (i.e., illustrates the case when the MNO requests (pulls) multipath policies from the AF.

In steps 1 and 2, a consumer (e.g. the PCF) retrieves both application data (App-ID=example.com) and subscription data (UE-ID). That is, PCF triggers a Nudr_Query Request message to the UDR including the App-ID and UE-ID as parameters. In case App-ID is not present, it indicates request for application data for every application.

In step 3, the UDR returns application data (for App-ID=example.com) and subscription data (for UE-ID) including support of AF Event-ID=MultipathPolicy for App-ID (example.com).

In steps 4 and 5, the PCF requests AF MultipathPolicy for App-ID=example.com and triggers NEF/AF discovery procedure for Event-ID=MultipathPolicy for App-ID=example.com. That is, the PCF triggers towards NRF a Nnrf_NFDiscovery request message including the following parameters: nfType=NEF; nfService=Naf_EventExposure; nefInfo (Event-ID=MultipathPolicy, App-ID=example.com).

In step 6, NEF answers PCF with the NEF instance address.

In step 7, PCF trigger towards the NEF instance a Nnef Request message including the following parameters: i) Naf_EventExposure; ii) Event-ID=MultipathPolicy; iii) UE-ID; and iv) App-ID=example.com.

In step 8, the NEF forwards the request towards the AF by triggering a Naf Request message including the same parameters as in the message in step 7.

In steps 9 and 10, the AF transmits to the NEF a message comprising the AF MultipathPolicy and a protocol identifier (referred to as "App-ID-Protocol") for the App-ID=example.com and UE-ID. In one embodiment, the AF MultipathPolicy includes UL and DL steering policies, and the protocol identifier (App-ID-Protocol) identifies the protocol stack (e.g. HTTP/3 which goes over QUIC, HTTP/2 which goes over Transport Layer Security (TLS)) used by the application (App-ID=example.com). This is relevant information for UE to apply the UL steering policies and for UPF to apply the DL steering policies.

In step 11, the NEF forwards the message above towards PCF including the same parameters as in the message in previous step.

In step 12, the PCF applies the corresponding logic (e.g. generate a PCC rule for the App-ID taking into account the AFMultipathPolicy and App-ID-Protocol).

Push Procedure

Figure 4:
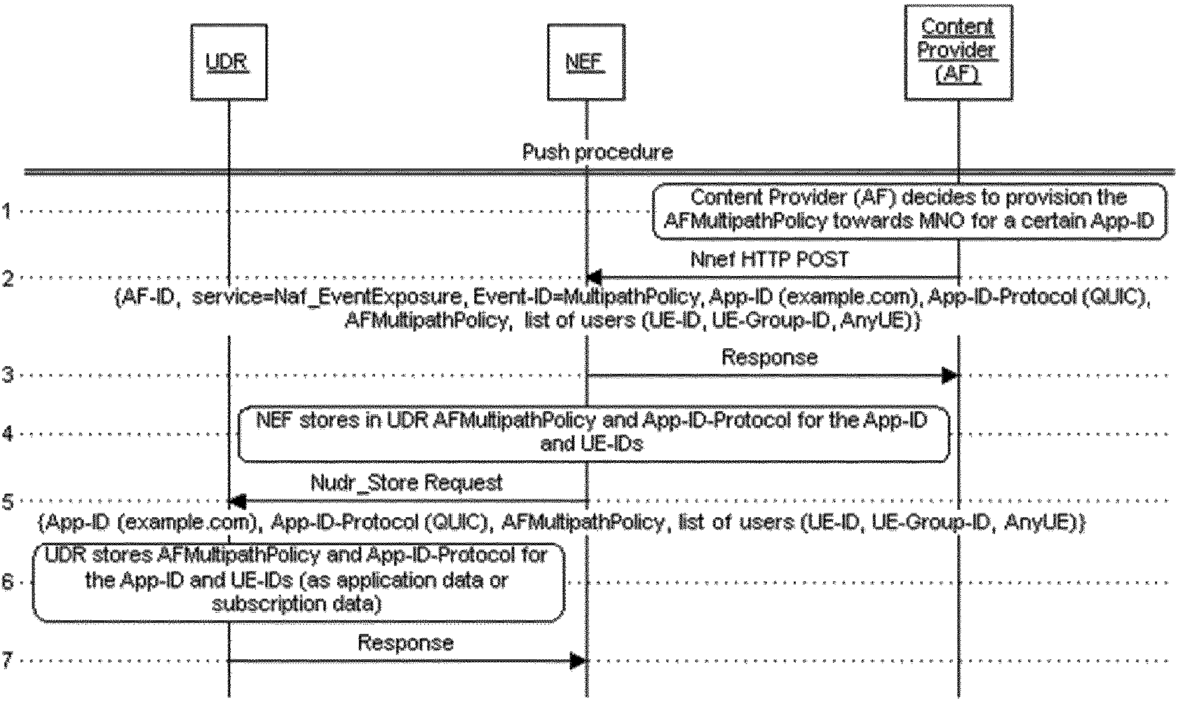
FIG. 4 illustrates a push procedure.

FIG. 4 illustraextes the push procedure according to an embodiment (i.e., illustrates the AF pushing a multipath policy to the MNO).

In step 1, the AF decides to provision a multipath policy for a certain App-ID. Accordingly, in step 2 the AF transmits an Nnef HTTP POST message towards the NEF including the following parameters: i) AF identifier (AF-ID) that identifies the AF; ii) service=Naf_EventExposure; iii) Event-ID=MultipathPolicy; iv) App-ID (example.com); v) protocol identifier (App-ID-Protocol) (e.g., QUIC); an AF multipath policy (AFMultipathPolicy), which includes UL and/or DL steering policies; and vii) list of one or more users (UE-ID, UE-Group-ID, AnyUE).

The App-ID-Protocol parameter identifies the protocol stack (e.g. HTTP/3 which goes over QUIC, HTTP/2 which goes over TLS) used by the application (App-ID=example.com). This is relevant information for UE to apply the UL steering policies and for UPF to apply the DL steering policies. The AF multipath policy can be for any UE (by including the "AnyUE" value in the list of one or more users) or per individual UE (by including a specific UE-ID), and it is also possible for the AF to provision a policy for a set of UEs (either as a list of individual UE-IDs or even a UE group: UE-Group-ID).

In step 3, the NEF answers AF with a successful response (accepting the provisioning above).

In steps 4 and 5, the NEF stores in the UDR AFMultipathPolicy and App-ID-Protocol for the App-ID and UE-IDs. In order to do this, NEF triggers a Nudr_Store Request message including the following parameters: i) App-ID (example.com); ii) App-ID-Protocol (QUIC); iii) AFMultipathPolicy; and iv) list of users (UE-ID, UE-Group-ID, AnyUE).

In step 6, the UDR stores AFMultipathPolicy and App-ID-Protocol for the App-ID and UE-IDs, as follows: If the AFMultipathPolicy is for an individual UE (UE-ID), this might be stored in UDR as subscription data; and if the AFMultipathPolicy is for all UEs (AnyUE), this might be stored in UDR as application data (and not by replicating the same policy for every subscriber). Similar in case of UE-Group-ID (stored as application data for the UE-Group-ID).

In step 7, the UDR answers NEF with a successful response (accepting the store request above).

Extension of the UE Assisted Mode

Figure 5A:
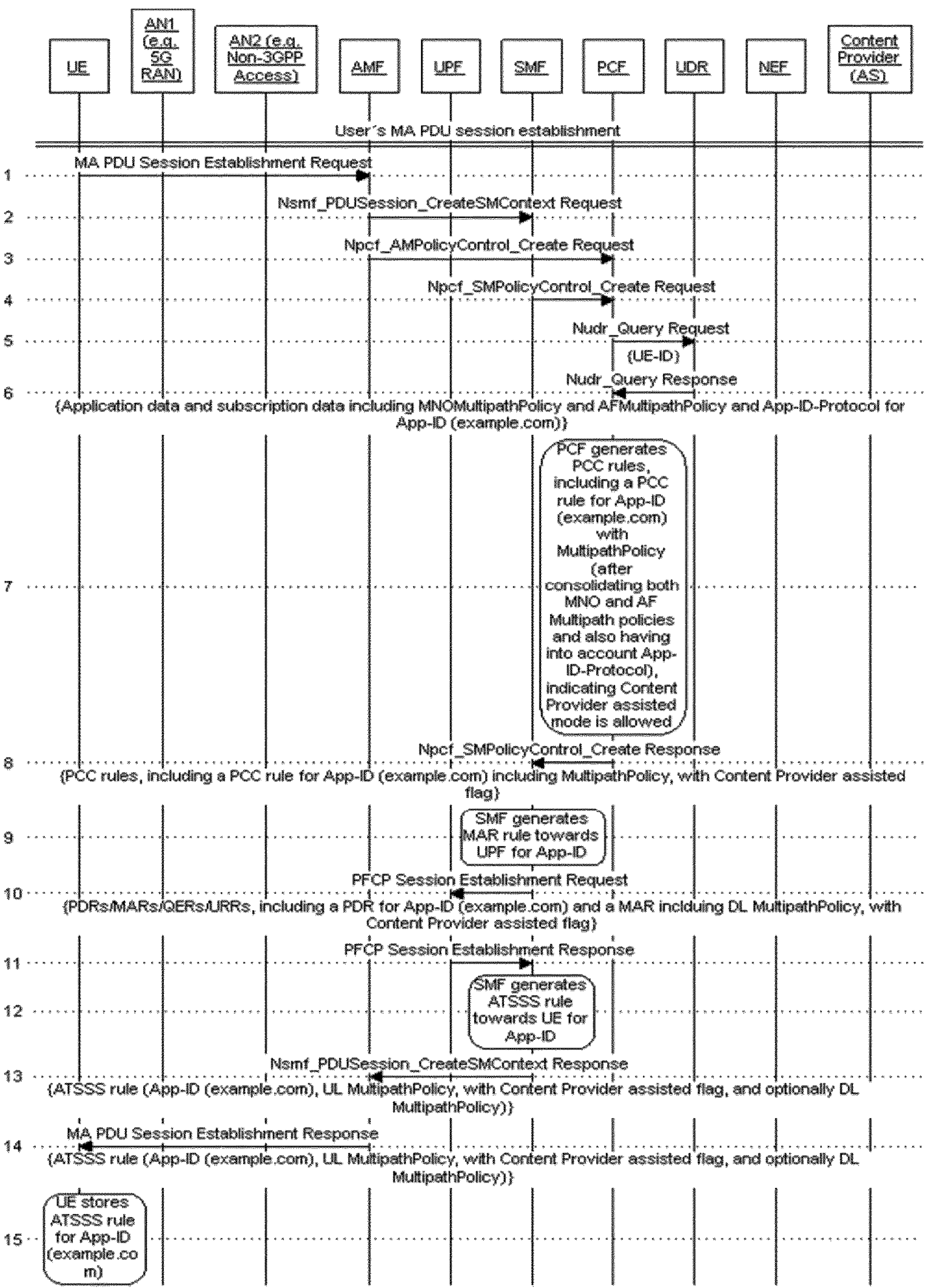
FIGS. 5A, 5B, and 5C illustrate a UE assisted mode according to an embodiment
Figure 5B:
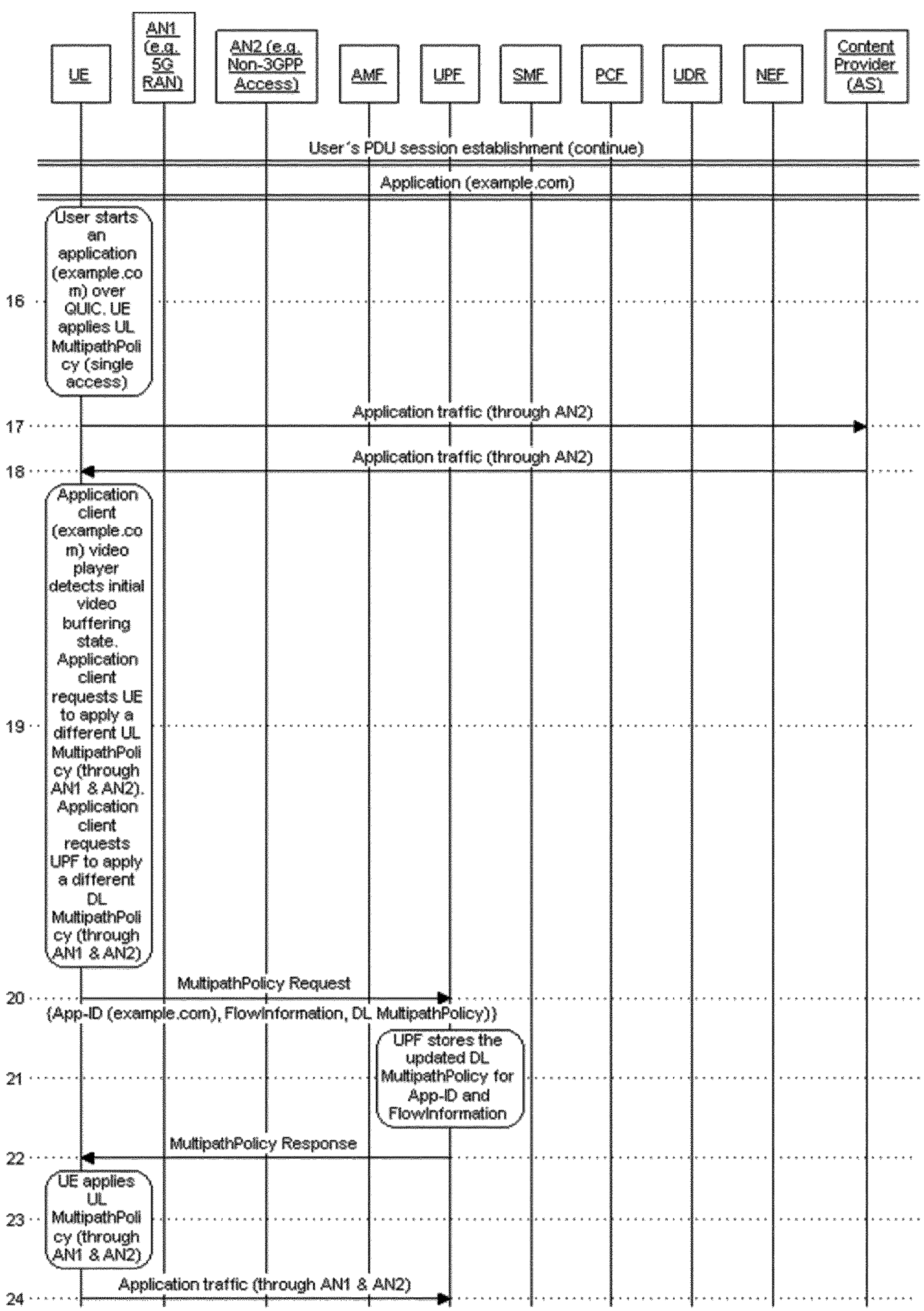
Figure 5C:
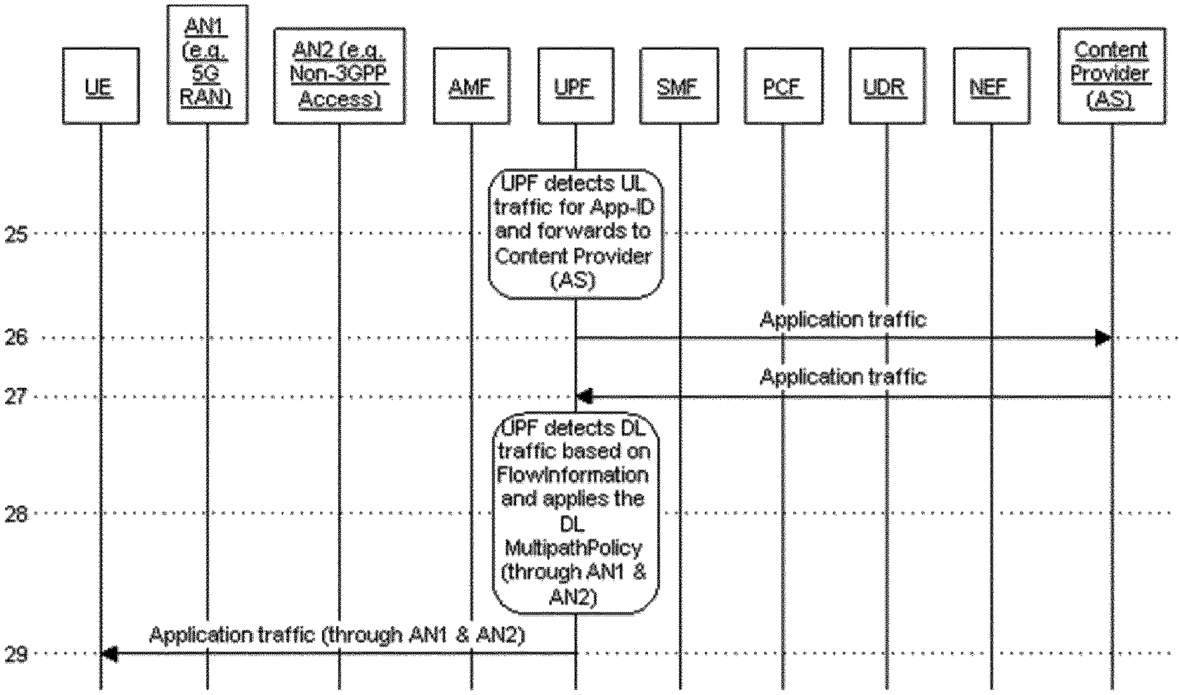

FIGS. 5A, 5B, and 5C illustrate a UE assisted mode according to an embodiment (i.e., illustrates a case where an application dynamically requests a certain AF multipath policy). In this example, it is assumed that the push procedure has been performed, so the UDR has stored as part of the subscriber profile (UE-ID) the AFMultipathPolicy and App-ID-Protocol for the App-ID (example.com). UDR might also have stored the MNO multipath policy for the App-ID (example.com).

In step 1, the UE initiates the establishment of a multi-access (MA) PDU session establishment by sending a MA PDU Session Establishment Request to an Access and Mobility management Function (AMF) 117 (FIGS. 5A, B, and C do not include all the signaling messages involved in the MA PDU Session Establishment procedure). The relevant messages are described below.

In step 2, the AMF selects an SMF to manage the PDU session and triggers Nsmf_PDUSession_CreateSMContext Request message.

In step 3, the AMF selects a PCF to manage the PDU session and triggers Npcf_AMPolicyControl_Create Request message.

In step 4, the SMF triggers Npcf_SMPolicyControl_Create Request message to retrieve SM policies for the user PDU session.

In step 5, the PCF triggers Nudr_Query Request message to retrieve the application data and subscription data for this user's PDU session by indicating the UE-ID.

In step 6, the UDR answers with Nudr_Query Response message including both application data and subscription data, specifically including the following information: i) App-ID (example.com); ii) MNOMultipathPolicy (MNO preferred MultipathPolicy); iii) AFMultipathPolicy (retrieved from the Push procedure above); and iv) App-ID-Protocol (retrieved from the Push procedure above).

In step 7 the PCF generates one or more PCC rules.

In step 8, the PCF installs the PCC rules in the SMF (i.e., the PCF transmits to the SMF a message (e.g., Npcf_SM-PolicyControl_Create response) comprising the PCC rules).

The one or more PCC rules generated in step 7 includes a PCC rule for App-ID (example.com). The PCC rule for App-ID contains a multipath policy and a content provider assistance indicator (a.k.a., "flag") indicating whether or not content provider assisted mode is allowed. The multipath policy included in the PCC rule for App-ID is generated based on the MNO and AF Multipath policies and the App-ID-Protocol parameter received in step 6. For example, in generating the PCC rule for App-ID, PCF determines whether the AF multipath policy is compatible with the MNO multipath policy. The AF multipath policy is compatible with the MNO multipath policy if it does not conflict with the MNO policy. For instance, if the AF multipath policy indicates a preference for a specific steering mode and if the MNO policy indicates that any steering mode is acceptable, then AF multipath policy would not conflict with the MNO multipath policy.

In one embodiment, the multipath policy included in the PCC rule for App-ID includes: i) an UL steering mode attribute value identifying at least one UL steering mode (e.g., "Active-Standby", "Smallest Delay", "Load Balancing", "Priority Based"); ii) a DL steering mode attribute value identifying at least one DL steering mode; and iii) a steering functionality attribute value indicating a steering functionality. The PCF selects the steering functionality attribute value to include in the PCC rule for App-ID based on the value of App-ID-Protocol parameter included in the message received in step 6.

In step 9, after receiving from the PCF the message comprising the PCC rules, the SMF generates, among other things, a multi-access rule (MAR) for App-ID based on the PCC rule for App-ID. The MAR for App-ID comprises a DL multipath policy (e.g., a steering mode attribute identifying a DL steering mode). The MAR may also include a first FAR ID identifying a first FAR for a first access type (e.g., 3GPP) and a second FAR ID identifying a second FAR for a second access type (e.g., non-3GPP).

In step 10, the SMF provides to the UPF, among other things, the MAR. For example, as shown in step 10 the SMF transmits to the UPF a PFCP Session Establishment Request message that includes session management parameters, including the MAR for App-ID. The session management parameters may also include one or more PDRs (e.g. a PDR for App-ID), one or more QERs, one or more URRs, and the content provider assistance flag.

In step 11, UPF answers SMF with a successful PFCP Session Establishment Response message.

In step 12, based on the PCC rule for App-ID, the SMF generates an ATSSS rule for the UE for App-ID. The ATSSS rule includes: i) a traffic descriptor parameter set to App-ID (example.com); ii) an UL multipath policy (e.g., information specifying an UL traffic steering rules); an iii) the content provider assisted flag, the value of which indicates whether or not content provider assistance is allowed. In some embodiments, the ATSSS rule further includes a DL MultipathPolicy (e.g., information specifying one or more DL traffic steering rules, from which UE is able to select, when content provider assisted mode is used.

In step 13, the SMF transmits towards the UE, via the AMF, a message comprising the ATSSS rule generated in step 12.

In step 14, the AMF forwards to the UE the ATSSS rules in previous step (e.g. in the MA PDU Session Establishment Response message).

In step 15, the UE stores the ATSSS rules, including the ATSSS rule for App-ID (example.com).

In step 16, the user of the UE starts an application (example.com) over QUIC. In the case of using MASQUE for exposure of multipath policies, the application establishes inner and outer connections to a QUIC proxy in the UPF. The UE (based on the stored ATSSS rule for App-ID=example-com) applies the corresponding UL MultipathPolicy (e.g. application traffic through single access, e.g. AN2 Non-3GPP Access: WiFi). It is proposed that UE (lower layers) exposes the UL MultipathPolicy (UL traffic steering modes as the ones from which UE is able to select and also the one being applied currently) to the application by means of an internal API (e.g. it could be an extension of the existing MP-TCP API in iOS or a new API). Optionally, the UE (lower layers) might also expose the DL MultipathPolicy (DL traffic steering modes as the ones from which UE is able to select and also the one being applied currently) to the application by means of the same API.

In step 17, the UE transmits, towards a content provider AF, traffic generated by the application over a single access (AN2). As this traffic is generated by the application and transmitted by the UE to the network, the traffic is UL application traffic.

In step 18, DL application traffic from the AF goes over single access (AN2). That is, in step 18, the UPF receives DL application traffic and applies the corresponding DL MultipathPolicy installed in UPF at step 10 above (e.g. DL application traffic through single access, e.g. AN2 Non-3GPP Access: WiFi).

In step 19, the application (e.g., a video player) detects an event (e.g., initial video buffering state), and, in response to detecting the event, based on the support of content provider assisted mode of operation (see step 16 above), the application requests the UE (i.e., a lower protocol layer in the UE) (through, for example, the API mentioned in step 16 above) to apply a different UL multipath policy (e.g. through access network 1 (AN1) & access network 2 (AN2)) for traffic (e.g., PDUs) generated by the application. The UE may use the value of the content provider assisted flag to determine whether or not to accept the request from the application.

In the embodiment shown, the application also decides to request the UPF to apply a different DL multipath policy (e.g. through AN1 & AN2) for traffic addressed to the application. The above implies that this specific application traffic will be conveyed through AN1 & AN2 in order to speed up the delivery of the application traffic, which in a video streaming scenario will speed up the video startup phase by reducing the amount of time that it takes the application to fill its video buffer).

In step 20, the UE transmits towards the UPF a MultipathPolicy Request message including the following information: i) App-ID (example.com); ii) FlowInformation; iii) DL MultipathPolicy (DL steering rules towards AN1 & AN2). This message can be conveyed using MASQUE (i.e. through the outer QUIC connection between UE application and the QUIC proxy at UPF) or through PMF. The FlowInformation is information that identifies traffic (e.g., PDUs) that are destined for the application. Accordingly, the FlowInformation may comprise an IP address of the UE and a port number (e.g., a TCP port number) on which the application is listening or it may comprise other addressing information.

In step 21, UPF stores the updated DL MultipathPolicy for App-ID (example.com) and the FlowInformation.

In step 22, UPF answers UE with a successful response (accepting the MultipathPolicy request above).

In steps 23 and 24, UE applies the UL MultipathPolicy (through AN1 & AN2), so the UL application traffic for that flow (FlowInformation) goes through AN1 & AN2.

In steps 25 and 26, the UPF detects UL traffic for App-ID (example.com) and forwards to the AF.

In step 27, the AF triggers DL traffic for the application (in this case for the video flow).

In steps 28 and 29, the UPF detects DL application traffic based on FlowInformation and applies the DL MultipathPolicy (through AN1 & AN2), so the DL application traffic for that flow (FlowInformation) goes through AN1 & AN2.

In some embodiments, after the application detects that initial video buffering state is finished, the application might request to go back to the default UL & DL MultipathPolicy (e.g. through AN2).

Further Embodiment

In some scenarios the Nnef APIs are not supported (e.g. in case of small content providers and/or small MNOs). In this embodiment, the application might request multipath policies from an API server (operated by the Content Provider) and then express the set of multipath policies to the UE via a device internal API. This could be done by extending MASQUE as follows: (1) the application queries UE (Modem/OS) about (MNO) multipath policies; (2) if policies do not match the content provider preference, the following steps apply: (2a) the application provides to the UPF the content provider multipath policies (e.g., the UE includes the set of multipath policies in CONNECT-UDP request through MASQUE (or in a separate request)); (2b) the UPF extracts the multipath policies and propagates them to control plane (e.g. to PCF through SMF); and (2c) if the multipath policies are acceptable to the MNO (PCF), PCF stores them in UDR (as content provider multipath policies, so they can be used for subsequent MA PDU sessions from this subscriber) and PCF answers UPF through SMF, so the MASQUE response (from UPF to UE) indicates those multipath policies can be used (or in case only a subset can be used, only those are returned).

Figure 6:
FIG. 6 is a flowchart illustrating a process according to an embodiment.
Figure 6:
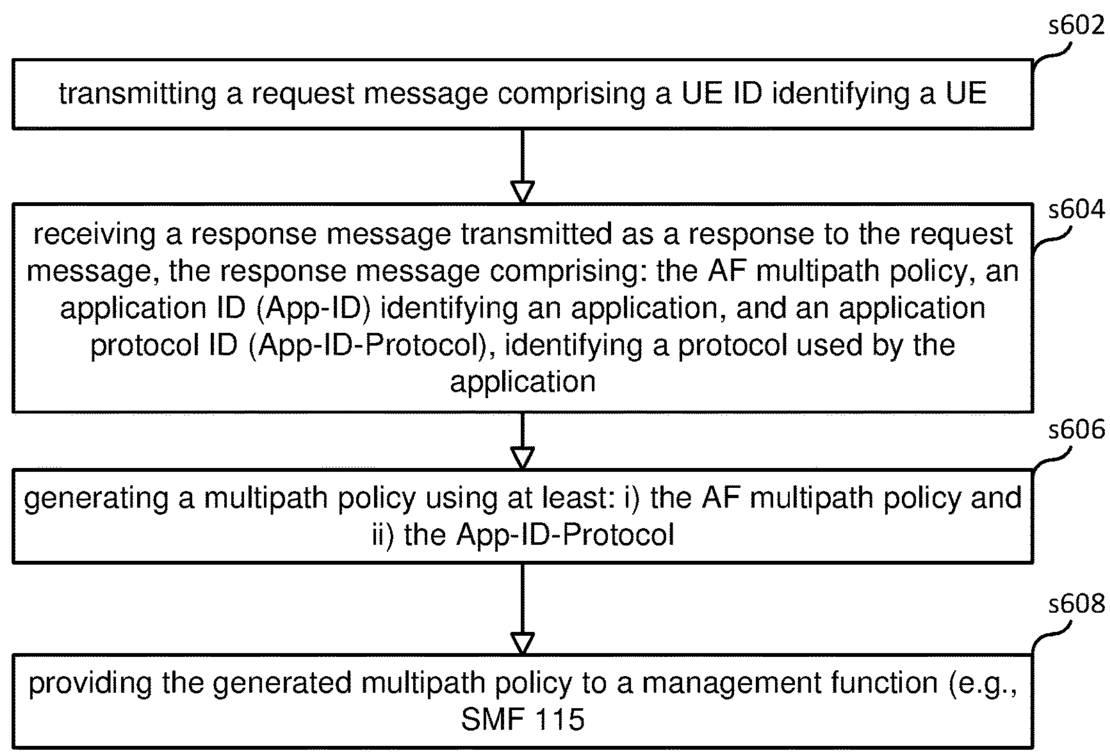

FIG. 6 is a flowchart illustrating a process 600 for implementing an application function (AF) multipath policy. Process 600 may be performed by PCF 113 and may begin in step s602. Step s602 comprises transmitting a request message comprising a UE ID identifying a UE. In some embodiments, the request message is transmitted toward an AF. Step s604 comprises receiving a response message transmitted as a response to the request message, the response message comprising: the AF multipath policy, an application ID (App-ID) identifying an application to which the AF multipath policy applies, and an application protocol ID (App-ID-Protocol), identifying a protocol used by the application. In some embodiments, the response message further comprises an indicator indicating that a UE assisted mode is allowed. In some embodiments (e.g., embodiments in which the request is transmitted to a user data repository), the response message may comprises a set of App-IDs, each identifying a different application, and, for each App-ID, the response message includes an AF multipath policy for the application identified by the App-ID and an App-ID-Protocol identifying a protocol used by the application identified by the App-ID. Step s606 comprises generating a multipath policy using at least: i) the AF multipath policy and ii) the App-ID-Protocol. Step s608 comprises providing the generated multipath policy to a management function (e.g., SMF 115).

In some embodiments, the request message is transmitted to a data repository, the response message further comprises a mobile network operator (MNO) multipath policy, and the generated multipath policy is generated using at least: i) the AF multipath policy ii) the App-ID-Protocol, and ii) the MNO multipath policy.

In some embodiments, generating the multipath policy comprises selecting a steering functionality based on the App-ID-Protocol.

In some embodiments, the generated multipath policy comprises: uplink, UL, steering mode information identifying at least a first UL steering mode, downlink, DL, steering mode information identifying at least a first DL steering mode, and steering functionality information identifying the selected steering functionality.

Figure 7:
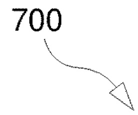
FIG. 7 is a flowchart illustrating a process according to an embodiment.
Figure 7:
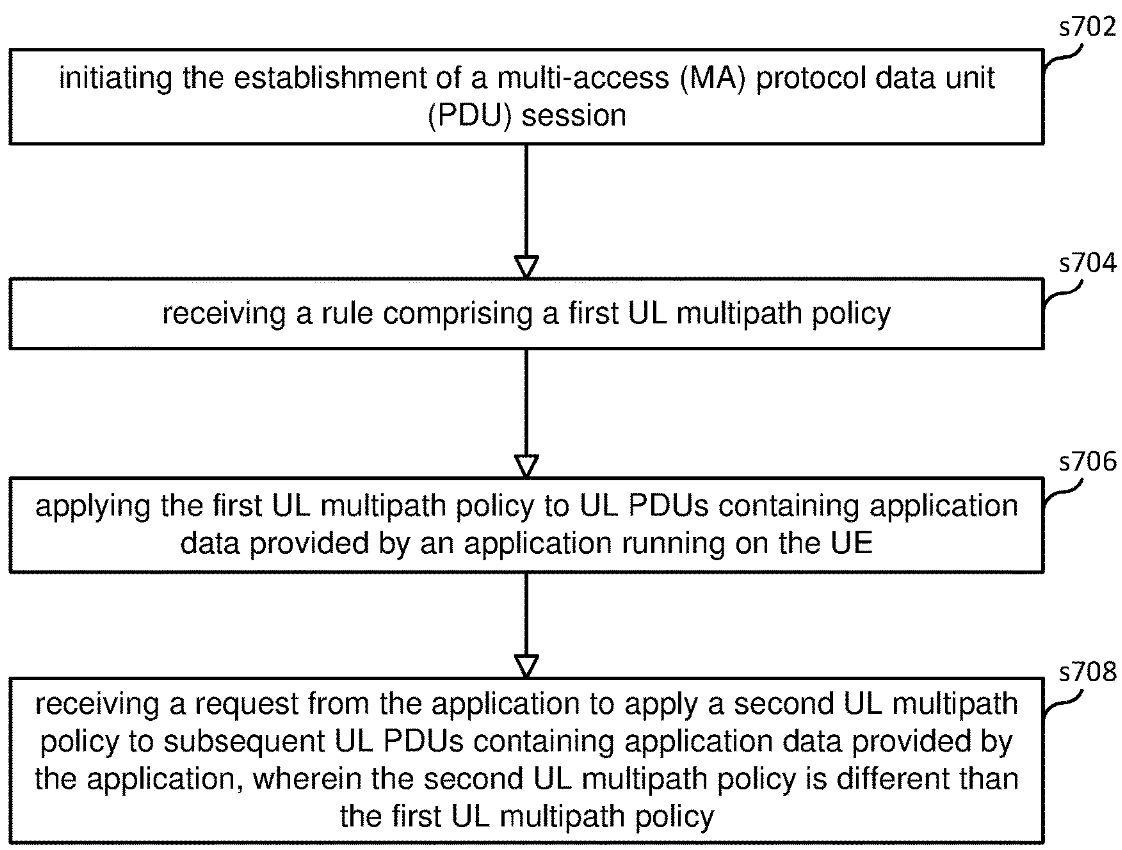

FIG. 7 is a flowchart illustrating a process 700 for implementing an application function (AF) multipath policy. Process 700 may be performed by UE 102 and may begin in step s702. Step s702 comprises initiating the establishment of a multi-access (MA) protocol data unit (PDU) session. Step s704 comprises, after initiating the establishment of the MA PDU session, receiving a rule comprising a first UL multipath policy. In some embodiments, the rule further includes an indicator indicating whether or not a content provider assisted mode is allowed. Step s706 comprises, after receiving the rule, applying the first UL multipath policy to UL PDUs containing application data provided by an application running on the UE. Step s708 comprises receiving a request from the application to apply a second UL multipath policy to subsequent UL PDUs containing application data provided by the application, wherein the second UL multipath policy is different than the first UL multipath policy.

In some embodiments, process 700 further comprises, in response to receiving the request from the application to apply the second UL multipath policy, the UE determining whether the indicator included in the rule indicated that the content provider assisted mode is allowed; and as a result of determining that the indicator included in the rule indicated that the content provider assisted mode is allowed, applying the second UL multipath policy to the subsequent UL PDUs.

In some embodiments, the rule further comprises DL steering mode information identifying a DL steering mode. In some embodiments, the process further comprise the UE transmitting to a UPF a multipath policy request message comprising the DL steering mode information identifying the DL steering mode. In some embodiments, transmitting the multipath policy request message to the UPF comprises transmitting the multipath policy request message via a QUIC connection to a QUIC proxy implemented in the UPF.

Figure 8:
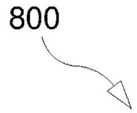
FIG. 8 is a flowchart illustrating a process according to an embodiment.
Figure 8:
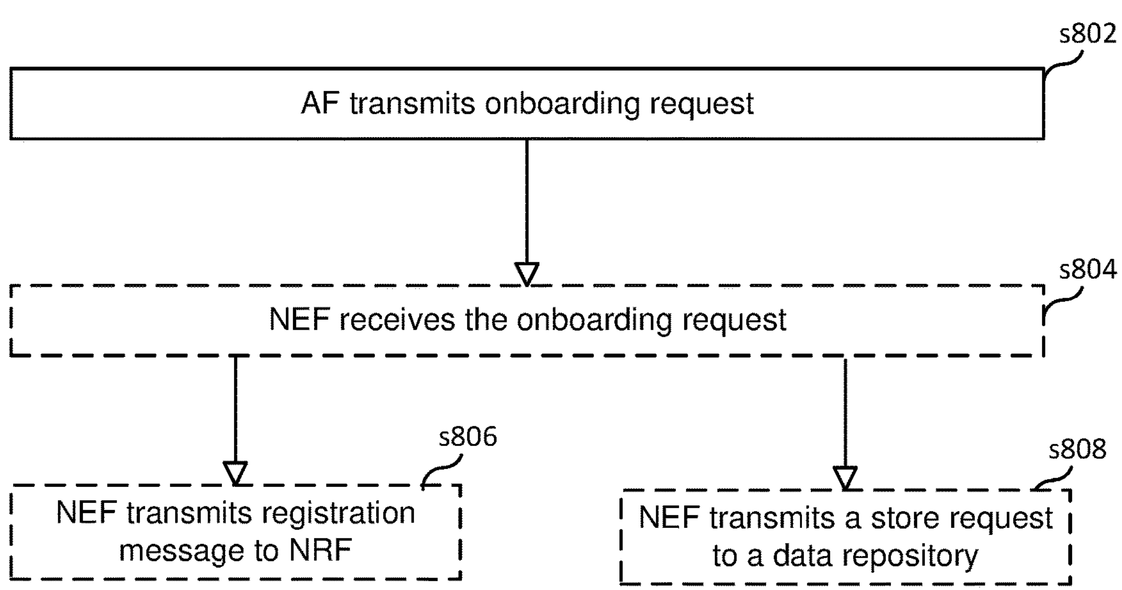

FIG. 8 is a flowchart illustrating a process 800 for use in onboarding an application function (AF) multipath policy (AFMultipathPolicy). Process 800 may begin in step s802. Step s802 comprises an AF (e.g., AF 111) transmitting an onboarding request, the onboarding request comprising: an AF identifier, ID, that identifies the AF, a service identifier indicating that the AF supports an event exposure service, an event identifier indicating that the AF supports multipath policy event as part of the event exposure service, and application ID information comprising at least one application ID, App-ID, that identifies a specific application. In some embodiments, the onboarding request further comprises a user equipment, UE, ID identifying a specific UE, a group UE ID identifying a group of UEs, or an any UE ID that indicates that the AFMultipathPolicy is for any UE. In some embodiments process 800 further includes a network exposure function (e.g., NEF 112), receiving the onboarding request (step s804). In some embodiment, process 800 further includes: the NEF, in response to receiving the onboarding request, transmitting (step s806) a registration message to a network registration function (e.g., NRF 114), the registration message comprising the AF ID, the service identifier, and the application ID information; and/or the NEF, in response to receiving the onboarding request, transmitting (step s808) a store request message to a data repository, the store request message comprising the AF ID, the event exposure identifier, and the application ID information.

Figure 9:
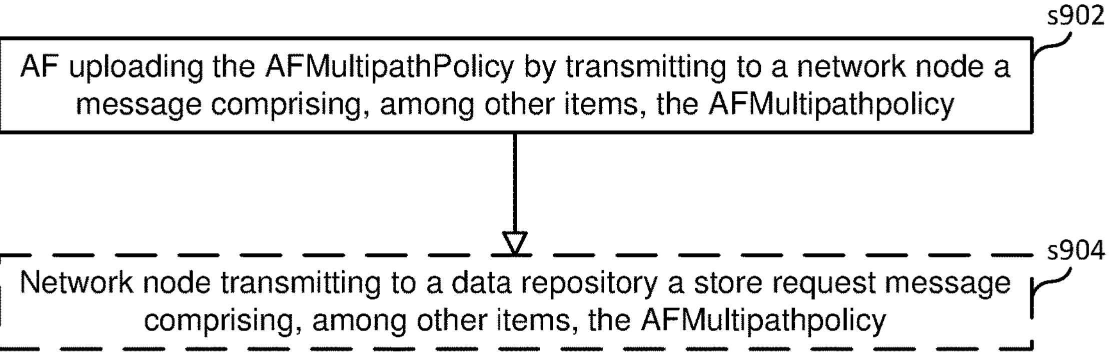
FIG. 9 is a flowchart illustrating a process according to an embodiment.

FIG. 9 is a flowchart illustrating a process 900 for provisioning an application function (AF) multipath policy (AFMultipathPolicy). Process 900 may begin in step s902. Step s902 comprises an AF (e.g., AF 111) uploading the AFMultipathPolicy by transmitting to a network node (e.g., a network node implementing an NEF), a message comprising: an AF identifier, ID, that identifies the AF, a service identifier indicating that the AF supports an event exposure service, an event identifier indicating that the AF supports multipath policy event as part of the event exposure service, application ID information comprising at least one application ID, App-ID, that identifies a specific application, and the AFMultiPathPolicy. In some embodiments, the AFMultipathPolicy comprises: UL steering mode information identifying at least one UL steering mode, and/or DL steering mode information identifying at least one DL steering mode. In some embodiments, process 900 further includes the network node, in response to receiving the message transmitted by the AF, transmitting a store request message to a data repository (step s904), the store request message comprising the AF ID, the service identifier, the application ID information, and the AFMultipathPolicy.

Figure 10:
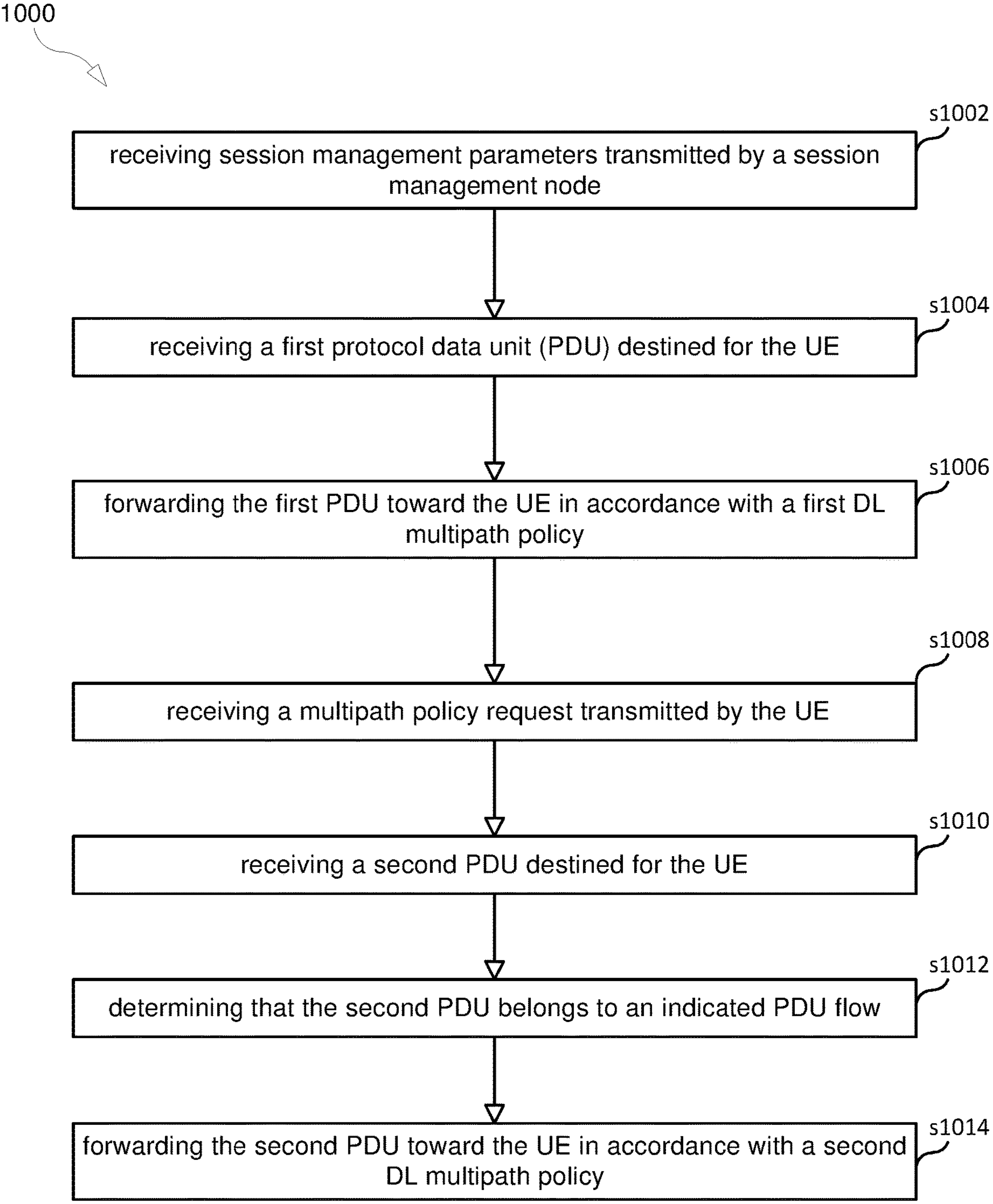
FIG. 10 is a flowchart illustrating a process according to an embodiment.

FIG. 10 is a flowchart illustrating a process 1000 performed by a user plane network node (e.g., a network node implanting UPF 116). Process 1000 may begin in step s1002. Step s1002 comprises receiving session management parameters transmitted by a session management node (e.g., a network node implementing SMF 115), the session management parameters being related to a session being established for a UE (e.g., UE 102) and comprising: a packet detection rule (PDR), a multi-access rule (MAR) comprising a first DL multipath policy, and a content provider assisted flag indicating whether or not content provider assistance is allowed. In some embodiments, the first DL multipath policy comprises a steering mode attribute identifying a first DL steering mode. In some embodiments, process 1000 further includes receiving a first protocol data unit (PDU) destined for the UE (step s1004) and forwarding the first PDU toward the UE in accordance with the first DL multipath policy (step s1006). In some embodiments, process 1000 further includes: after forwarding the first PDU toward the UE, receiving a multipath policy request transmitted by the UE (step s1008), the multipath policy request comprising a second DL multipath policy that is different than the first DL multipath policy; after receiving the multipath policy request, receiving a second PDU destined for the UE (step s1010); and forwarding the second PDU toward the UE in accordance with the second DL multipath policy (step s1014). In some embodiments, the multipath policy request further comprises a packet detection information (e.g., an IP Packet Filter) indicating a PDU flow associated with the second DL multipath policy; and the process further includes, prior to forwarding the second PDU toward the UE in accordance with the second DL multipath policy, determining that the second PDU belongs to the indicated PDU flow (step s1012).

While the content provider exposes its preferred multipath policies to the MNO, the MNO is still in control, i.e. MNO controls the DL steering policies at UPF (as this needs to be authorized by PCF through N7/N4). Regarding UL steering policies, they are in general under UE control (as MNO cannot force UE vendors).

While the embodiments described herein are exemplified using the 5G network architecture, the embodiments are not limited to a 5G network as the same procedures can be applied to a 4G network (e.g., replace AF by SCS or AS; NEF by SCEF; PCF by PCRF; SMF by PGW-C or TDF-C; UPF by PGW-U or TDF-U) or other network (e.g., a sixth generation (6G) network).

Figure 11:
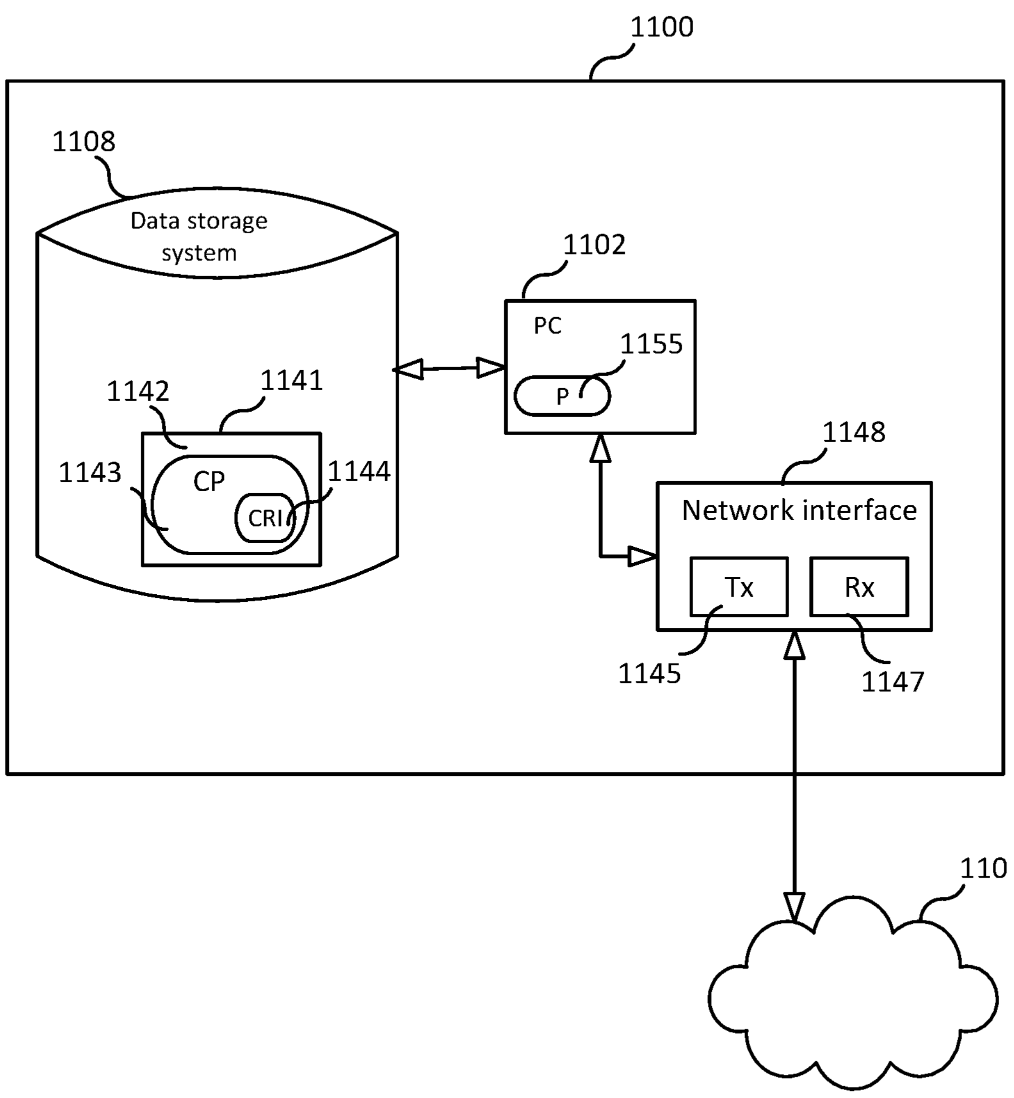
FIG. 11 is a block diagram of a network node according to an embodiment.

FIG. 11 is a block diagram of network node 1100, according to some embodiments, for implementing any one of the network function described herein, such as, but not limited to: PCF, SMF, UPF, NEF, UDR, AF or their 4G equivalents. As shown in FIG. 11, network node 1100 may comprise: processing circuitry (PC) 1102, which may include one or more processors (P) 1155 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., network node 1100 may be a distributed computing apparatus); at least one network interface 1148 (e.g., a physical interface or air interface) comprising a transmitter (Tx) 1145 and a receiver (Rx) 1147 for enabling network node 1100 to transmit data to and receive data from other nodes connected to a network 110 (e.g., an Internet Protocol (IP) network) to which network interface 1148 is connected (physically or wirelessly) (e.g., network interface 1148 may be coupled to an antenna arrangement comprising one or more antennas for enabling network node 1100 to wirelessly transmit/receive data); and a local storage unit (a.k.a., "data storage system") 1108, which may include one or more non-volatile storage devices and/or one or more volatile storage devices. In embodiments where PC 1102 includes a programmable processor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, magnetic media (e.g., a hard disk), optical media, memory devices (e.g., random access memory, flash memory), and the like. In some embodiments, the CRI 1144 of computer program 1143 is configured such that when executed by PC 1102, the CRI causes network node 1100 to perform steps described herein (e.g., steps described herein with reference to the flow charts). In other embodiments, network node 1100 may be configured to perform steps described herein without the need for code. That is, for example, PC 1102 may consist merely of one or more ASICs. Hence, the features of the embodiments described herein may be implemented in hardware and/or software.

Figure 12:
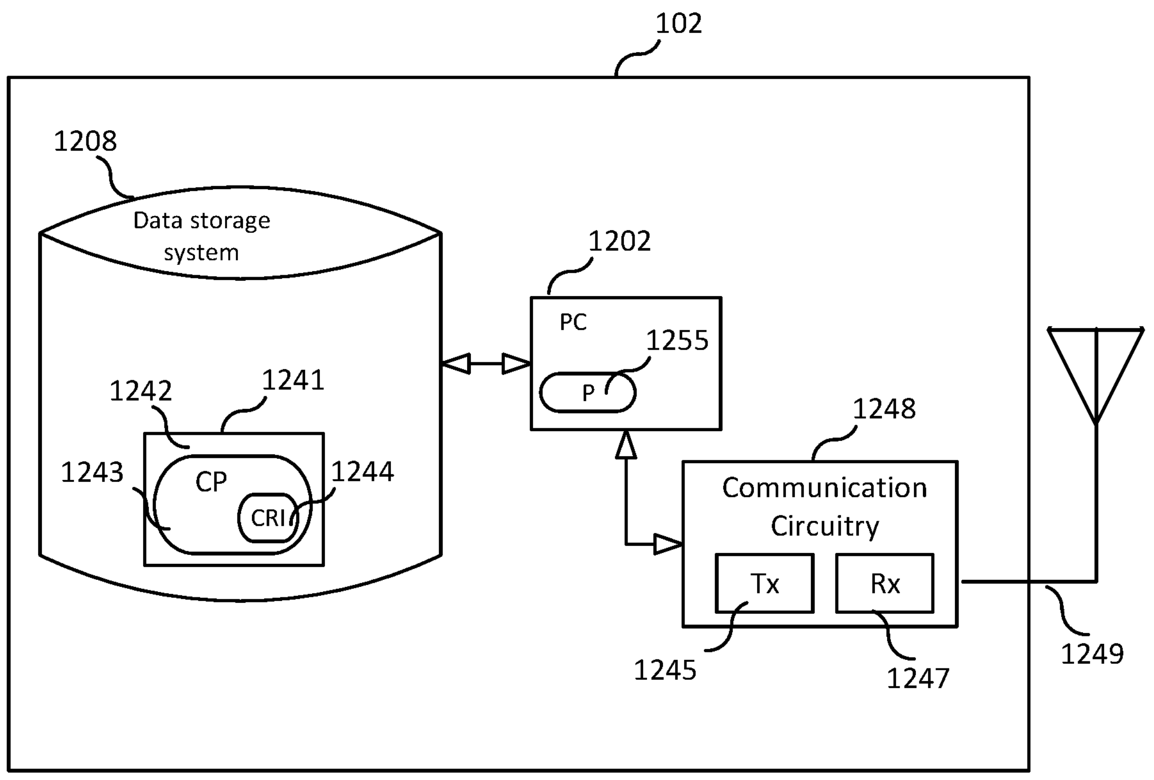
FIG. 12 is a block diagram of a UE according to an embodiment.

FIG. 12 is a block diagram of UE 102, according to some embodiments. As shown in FIG. 12, UE 102 may comprise: processing circuitry (PC) 1202, which may include one or more processors (P) 1255 (e.g., one or more general purpose microprocessors and/or one or more other processors, such as an application specific integrated circuit (ASIC), field-programmable gate arrays (FPGAs), and the like); communication circuitry 1248, which is coupled to an antenna arrangement 1249 comprising one or more antennas and which comprises a transmitter (Tx) 1245 and a receiver (Rx) 1247 for enabling UE 102 to transmit data and receive data (e.g., wirelessly transmit/receive data); and a local storage unit (a.k.a., "data storage system") 1208, which may include one or more non-volatile storage devices and/or one or more volatile storage devices. In embodiments where PC 1202 includes a programmable processor, a computer program product (CPP) 1241 may be provided. CPP 1241 includes a computer readable medium (CRM) 1242 storing a computer program (CP) 1243 comprising computer readable instructions (CRI) 1244. CRM 1242 may be a non-transitory computer readable medium, such as, magnetic media (e.g., a hard disk), optical media, memory devices (e.g., random access memory, flash memory), and the like. In some embodiments, the CRI 1244 of computer program 1243 is configured such that when executed by PC 1202, the CRI causes UE 102 to perform steps described herein (e.g., steps described herein with reference to the flow charts). In other embodiments, UE 102 may be configured to perform steps described herein without the need for code. That is, for example, PC 1202 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment (UE) for implementing an application function (AF) multipath policy, the method comprising:

initiating establishment of a multi-access (MA) protocol data unit (PDU) session;

after initiating the establishment of the MA PDU session, receiving a rule comprising a first uplink (UL) multipath policy, the rule further comprising an indicator indicating whether or not a content provider assisted mode is allowed;

after receiving the rule, applying the first UL multipath policy to UL PDUs containing application data provided by an application running on the UE;

receiving a request from the application to apply a second UL multipath policy to subsequent UL PDUs containing additional application data provided by the application, the second UL multipath policy being different than the first UL multipath policy;

in response to receiving the request from the application to apply the second UL multipath policy, determining whether the indicator included in the rule indicated that the content provider assisted mode is allowed; and as a result of determining that the indicator included in the rule indicated that the content provider assisted mode is allowed, applying the second UL multipath policy to the subsequent UL PDUs.

2. The method of claim 1, wherein the rule further comprises downlink (DL) steering mode information identifying a DL steering mode.

3. The method of claim 2, further comprising transmitting to a user plane function (UPF) a multipath policy request message comprising the DL steering mode information identifying the DL steering mode.

4. The method of claim 3, wherein the transmitting the multipath policy request message to the UPF comprises transmitting the multipath policy request message via a QUIC connection to a QUIC proxy implemented in the UPF.

5. A non-transitory computer storage medium storing a computer program comprising instructions which when executed by processing circuitry of an apparatus causes the apparatus to perform a method for implementing an application function (AF) multipath policy, the method comprising:

initiating establishment of a multi-access (MA) protocol data unit (PDU) session;

after initiating the establishment of the MA PDU session, receiving a rule comprising a first uplink (UL) multipath policy, the rule further comprising an indicator indicating whether or not a content provider assisted mode is allowed;

after receiving the rule, applying the first UL multipath policy to UL PDUs containing application data provided by an application running on a user equipment (UE);

receiving a request from the application to apply a second UL multipath policy to subsequent UL PDUs containing additional application data provided by the application, the second UL multipath policy different than the first UL multipath policy;

in response to receiving the request from the application to apply the second UL multipath policy, determining whether the indicator included in the rule indicated that the content provider assisted mode is allowed; and as a result of determining that the indicator included in the rule indicated that the content provider assisted mode is allowed, applying the second UL multipath policy to the subsequent UL PDUs.

6. A user equipment (UE) configured for implementing an application function (AF) multipath policy, the UE comprising:

processing circuitry; and a memory, the memory containing instructions executable by the processing circuitry, the UE being configured to initiate establishment of a multi-access (MA) protocol data unit (PDU) session;

after initiating the establishment of the MA PDU session, receive a rule comprising a first uplink (UL) multipath policy, the rule further comprising an indicator indicating whether or not a content provider assisted mode is allowed;

after receiving the rule, apply the first UL multipath policy to UL PDUs containing application data provided by an application running on the UE; and receive a request from the application to apply a second UL multipath policy to subsequent UL PDUs containing additional application data provided by the application, the second UL multipath policy being different than the first UL multipath policy;

in response to receiving the request from the application to apply the second UL multipath policy, determine whether the indicator included in the rule indicated that the content provider assisted mode is allowed; and as a result of determining that the indicator included in the rule indicated that the content provider assisted mode is allowed, apply the second UL multipath policy to the subsequent UL PDUs.

* * * * *